Figure 1:
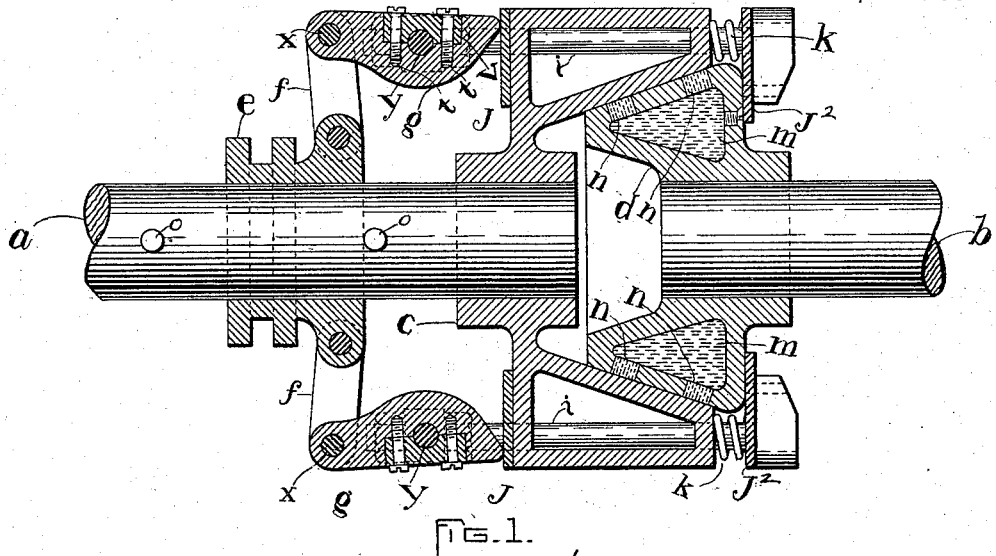

(No Model.)

F. L. SMITH.
CLUTCH.

No. 535,738. Patented Mar. 12, 1895.

WITNESSES:
A. D. Harrison
Rollin Abell

INVENTOR:
F. L. Smith
by Wright Brown & Quinby
Attys.

UNITED STATES PATENT OFFICE.

FRED L. SMITH, OF FRANKLIN, NEW HAMPSHIRE.

CLUTCH.

SPECIFICATION forming part of Letters Patent No. 535,738, dated March 12, 1895.

Application filed July 9, 1894. Serial No. 516,936. (No model.)

*To all whom it may concern:*

Be it known that I, FRED L. SMITH, of Franklin, in the county of Merrimac and State of New Hampshire, have invented certain new and useful Improvements in Friction-Clutch Mechanism, of which the following is a specification.

This invention relates to an improvement in friction clutches and consists in novel features of construction and arrangement of members hereinafter fully described in the specification and clearly illustrated in the drawings and fully pointed out in the claims.

Reference is to be had to the accompanying sheet of drawings, forming a part of this application, in which like characters indicate like parts wherever they occur.

Figure 2:
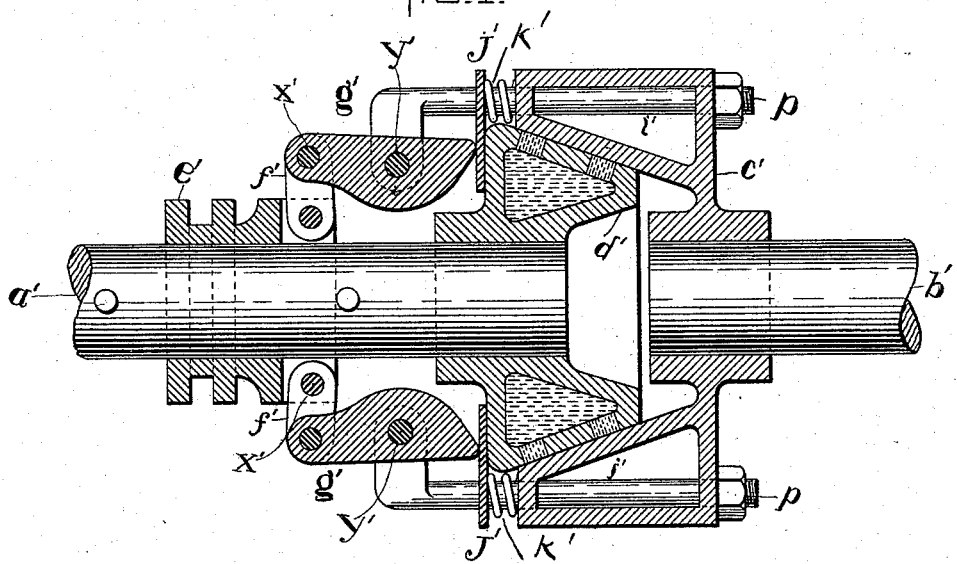
Figure 3:
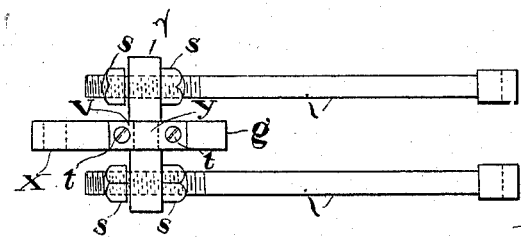

Figure 1 is a central longitudinal section view of my improved friction clutch mechanism showing the same as applied to divided shafts. Fig. 2 represents a central longitudinal section view of my improved friction clutch mechanism showing the same as applied to a divided shaft, but with the head and ring reversed from the position shown in Fig. 1. Fig. 3 is a detail view of the bolts and their connection with the levers $g$, as shown in Fig. 1.

Referring to Fig. 1, $a$ and $b$ represent the two confronting members of a divided shaft which the clutch is to connect. A frusto-conical shaped head, $d$, is slidingly mounted on the shaft, $b$, by means of a spline (not shown). This head is cast with an interior core or reservoir, $m$, which is filled with any desired lubricant. Apertures, $n$, in the periphery of said head connect with this oil reservoir. These apertures are plugged with some porous material through which the oil may ooze by capillary attraction, or through which the oil may be driven by centrifugal force during the rotation of the head, or by both these means combined.

The oiling of the gripping faces of the clutch is an essential feature of my invention, as in practice it has been found, especially in connection with cone-shaped clutches, that the faces slip and become heated and weld under high speed, unless they are oiled. The device here shown and described permits the oil or lubricant to be supplied to the contact surface of the clutch as needed. The amount of oil or lubricant to be so applied may be regulated at pleasure by means of the character of the plug used or the device employed to conduct the lubricant from the reservoir to the friction surface of the clutch. Manifestly, the oiling feature of my invention could be applied to any other form of clutch, but I prefer the cone-shaped clutch on account of the power of this form of clutch and the convenience of its operation, although I wish my invention to be understood as applying to any form of clutch where one member contains a reservoir which has communication with the friction surface of the clutch.

$c$ represents a frusto-conical shaped ring surrounding the periphery of the head, $d$. This ring, $c$, is slidingly mounted upon the shaft, $a$, and constructed and arranged to fit over the head, $d$. The head, $d$, is designed to be moved into and out of engagement with the ring, $c$, but this method may be reversed, and the ring be moved into and out of engagement with the head.

$e$ represents a sleeve or collar mounted upon the shaft, $a$, and arranged to rotate with the shaft, but to have a sliding movement thereon, said sliding movement being limited by stops, $o$. In this collar a groove is cut arranged to receive a shipping-fork (not shown) applied thereon in order to move said collar longitudinally on its shaft.

$ff$ represent levers pivoted at one end to the movable collar, $e$, and pivoted at the other end to cam levers, $g$, so constructed and arranged as to rock on the pivoted connection with the levers, $f$, and bear preferably on hardened steel plates, $jj$, secured to the ring, $c$.

$ii$ represent bolts mounted in this ring and connected to a bar, $r$, (see Fig. 3) by means of nuts, $s$. This bar has a reduced circular portion, Y, mounted in a bearing formed in the cam levers, $g$, and in block, $v$, secured to these levers by means of screws, $t$, the reduced portion Y on each bar forming a pivot for a cam lever $g$. These bolts terminate in a shoe which bears on hardened steel plates, $J^2$, secured to said head in any desired way.

To operate this clutch, the sleeve, $e$, is crowded forward toward the ring by the shipping-fork (not shown). This forward movement of the sleeve, $e$, is communicated to the levers, $f$, through the pivots. The cam levers, $g$, rocking on their pivots, Y, and by virtue of their increasing radius from pivots, Y, to plates, J, cause the bolts to be drawn to the left in Fig. 1. This movement being transmitted through the aforesaid bolts to their shoe-like ends which bear on the hard steel plates, $J^2$, cause the frusto-conical head, $d$, to be drawn toward the frusto-conical ring, $c$, engaging the face of the member, $d$, with the surface of the member, $c$. By virtue of their frusto-conical contour they cling firmly together and the motion of the driving shaft, $b$, is transmitted to the shaft $a$, by reason of the contact. The springs, $k$, mounted on the bolts 1 between the plates $J^2$ and the head $d$ and pressing against the plates, $J^2$, cause the members, $c$ and $d$, to disengage quickly when pressure on the bolts, $i$, is removed.

In Fig. 2 is represented a modified form of Fig. 1. The frusto-conical member or head, $d'$, and the frusto-conical ring or member, $c'$, are interchanged, $a'$ representing the driving shaft with the sleeve, $e'$, constructed and arranged the same as sleeve, $e$. This sleeve, $e'$ is connected by levers, $f'$, to cam levers, $g'$, substantially as in Fig. 1. These cam levers $g'$, are pivoted to angular projections on the bolts, $i'$, by means of pivots, Y'. These bolts are mounted in the ring $c'$ and are secured to said ring by means of nuts, $p$. The cam levers, $g'$, bear on hard steel plates, J', secured to the head, $d$. Springs, $k'$ are mounted upon the bolts, $i'$, as in Fig. 1, between the ring, $c'$ and plates, J' secured to the head, $d'$. When pressure is applied to the sleeve, $e'$, as in Fig. 1, the levers, $f'$, acting upon the cam levers, $g'$ which are pivoted at $x'$ and Y', cause these cam levers to draw the two members together, as has been hereinbefore shown and explained.

I would have it understood that I do not limit myself to the use of the invention on a divided shaft, since it may be employed on a solid shaft with the driven member constructed as a pulley or gear turning loose upon the shaft and adapted to be frictionally connected with the driving member at times when it is desired to render the driven member operative.

I disclaim the combination in a friction clutch, of a frusto-conical head fixed to one rotary part, a frusto-conical ring carried by another rotary part, and means for frictionally connecting said ring and head, my invention being limited to the constructions set forth in the following claims.

Having thus explained the nature of the invention and described a way of constructing and using the same, though without attempting to set forth all of the forms in which it may be made or all of the modes of its use, what I claim, and desire to secure by Letters Patent, is—

1. In a friction clutch, in combination, a friction member carried by one rotary part, a complemental friction member carried by another rotary part, means for frictionally connecting said members, an oil reservoir in the interior of one of said members, said members being provided with apertures communicating with said reservoir, substantially as and for the purpose set forth.

2. In a friction clutch, in combination, a frusto-conical head carried by one rotary part, a frusto-conical ring carried by another rotary part, means for frictionally connecting said members, an oil reservoir in the interior of said head, and the said head being provided with apertures communicating with the said reservoir, said apertures being closed with porous plugs, substantially as and for the purposes set forth.

3. In a friction clutch, in combination, a head $d'$ carried by one rotary part, a ring $c'$ carried by another rotary part, a sleeve $e'$, the bolts $i'$ secured to said ring $c'$, connections between said sleeve and said bolts including cam-levers $g'$, springs $k'$ mounted upon the bolts $i'$ between said ring $c'$ and plates J' that are secured to said head $d'$, the oil reservoir in the interior of said head $d'$ and apertures in the periphery of said head communicating with said reservoir.

In testimony whereof I have signed my name to this specification, in the presence of two subscribing witnesses, this 17th day of March, A. D. 1894.

FRED L. SMITH.

Witnesses:
HALLIS K. SMITH,
FRANK E. DANIELL.

It is hereby certified that in Letters Patent No. 535,738, granted March 12, 1895, upon the application of Fred L. Smith, of Franklin, New Hampshire, for an improvement in "Clutches," an error appears in the printed specification requiring correction, as follows: In line 69, page 2, the word "members" should read *member;* and that the said Letters Patent should be read with this correction therein that the same may conform to the record of the case in the Patent Office.

Signed, countersigned, and sealed this 2d day of April, A. D. 1895.

[SEAL.]

JNO. M. REYNOLDS,
*Assistant Secretary of the Interior.*

Countersigned:

JOHN S. SEYMOUR,
*Commissioner of Patents.*